US000001189H

United States Statutory Invention Registration [19]

[11] Reg. Number: H1189

[43] Published: May 4, 1993

Kirts

[54] METHOD AND APPARATUS FOR DESTROYING CERTAIN CHEMICAL AND BIOLOGICAL WARFARE AGENTS

[75] Inventor: Richard E. Kirts, Oxnard, Calif.

[73] Assignee: The United States of America as represented by the Secretary of the Navy, Washington, D.C.

[21] Appl. No.: 726,487

[22] Filed: Jul. 8, 1991

[51] Int. Cl.[5] ..... B01D 47/00

[52] U.S. Cl. ..... 588/200; 423/210; 423/245.3

[58] Field of Search ..... 423/210, 245.3, DIG. 20, 423/659; 422/4, 120; 55/279, 267; 588/200

[56] References Cited

U.S. PATENT DOCUMENTS

| | | | |
|---|---|---|---|
| 2,047,844 | 7/1936 | Wehner | 422/120 |
| 3,898,040 | 8/1975 | Tabak | 422/171 |
| 3,904,351 | 9/1975 | Smith et al. | 431/284 |
| 3,942,941 | 3/1976 | Perry | 422/4 |
| 3,966,407 | 6/1976 | Zuckerberg et al. | 422/120 |
| 4,106,286 | 8/1978 | Sakai et al. | 422/173 |
| 4,297,319 | 10/1981 | Ishibashi et al. | 422/114 |
| 4,315,893 | 2/1982 | McCallister | 422/109 |
| 4,666,696 | 5/1987 | Schultz | 423/659 |
| 4,871,526 | 10/1989 | Smentkowski et al. | 423/659 |

*Primary Examiner*—Donald P. Walsh
*Assistant Examiner*—Daniel Jenkins
*Attorney, Agent, or Firm*—Ron Billi; David S. Kalmbaugh

[57] ABSTRACT

An apparatus and method for destroying chemical and biological warfare (CBW) agents includes heating contaminated air in a compressor, flowing the hot compressed air through a reaction vessel to provide sufficient contact time to kill CBW agents; initially partially cooling the hot compressed air in an aftercooler; finally cooling the hot, compressed air by expansion in a turbine. Energy is recovered from the turbine to inverse efficiency. Additional power is supplied by external means.

10 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD AND APPARATUS FOR DESTROYING CERTAIN CHEMICAL AND BIOLOGICAL WARFARE AGENTS

BACKGROUND OF THE INVENTION

This invention relates generally to a method and apparatus for destroying chemical and biological warfare (CBW) agents present in the air. More specifically, but without limitation, the present invention relates to a method and apparatus for producing a large volume, and thermally-conditioned air supply for a building, vehicle or other inhabited area by using non- contaminating heat to destroy CBW agents that may be present in the ambient, breathable air supply.

In the past, various methods have been proposed to remove CBW agents from breathable air supplies such as mechanical filtration and chemical absorption. These systems usually consist of high efficiency air filters followed by absorber beds of activated carbon. However, these systems cannot guarantee that 100% of known CBW agents will be removed or that the system will work at all against an unknown CBW agent or against a virus, which is extremely small, and may pass-through unabsorbed and unremoved. In addition, contaminated filters and absorber beds must be removed and carefully disposed of presenting an extreme handling and environmental problem.

Other systems using heat have also been proposed since most chemical and biological warfare agents are organic compounds and can readily be oxidized or disassociated at temperatures of 500° F. to 1000° F. Biological agents are also destroyed at these temperatures. Accordingly, high temperature flames and jets have been proposed for both decontaminating the exterior of ships, tanks and other weapon systems and for oxidizing various materials present in the air. U.S. Pat. No. 3,904,351 to Smith et. al. dated Sep. 9, 1975 discloses an apparatus that produces a flame to decompose contaminants and U.S. Pat. No. 3,898,040 to Tabak dated Aug. 5, 1975 discloses an incinerator with burner means to thermally oxidize combustibles. Although these systems may remove CBW agents, they introduce additional undesirables in the form $CO_2$, CO and other contaminants. In addition, the heated air must then be cooled to an acceptable level requiring additional equipment and expense. Further, if a cool air supply is desired, air conditioning equipment must also be employed at greater expense and complexity.

Thus, there is a need in the art to provide an apparatus and method that can quickly and completely heat large volumes of air to destroy CBW agents, and that can quickly and efficiently cool the heated air to provide a breathable, warm air supply or further cool the air to provide a cool (air conditioned) breathable, air supply. It may also be desirable to provide a breathable air supply at a positive pressure to drive out and keep any contaminant from entering a building, tank or other space. It is therefore an object of the present invention to provide an apparatus and method for quickly and completely heating contaminated air to destroy CBW agents. It is another object of the present invention to provide a method and apparatus wherein the heated air may then be easily and efficiently cooled to any desired temperature. It is a further object of the present invention to provide an apparatus and method for providing a breathable air supply at a positive pressure.

SUMMARY OF THE INVENTION

Accordingly, the method and apparatus of the preferred embodiment of the present invention includes heating contaminated air in a compressor by adiabatic compression; flowing the compressed hot air through a reaction vessel to provide sufficient contact time to kill CBW agents; initially, partially cooling the hot, compressed air in an aftercooler; and finally cooling the hot, compressed air by expansion in a turbine (mechanical expander). Energy is recovered from the turbine (mechanical expander) and coupled to the compressor to increase efficiency. Additional power is supplied to the compressor by means of an external power source (e.g. gas turbine engine).

BRIEF DESCRIPTION OF THE DRAWINGS

Other objects, features and advantages of the present invention will become more fully apparent from the following detailed description of the preferred embodiment, the appended claims and the accompanying drawings in which:

DETAILED DESCRIPTION OF THE PREFERRED EMBODIMENT

Figure 1:
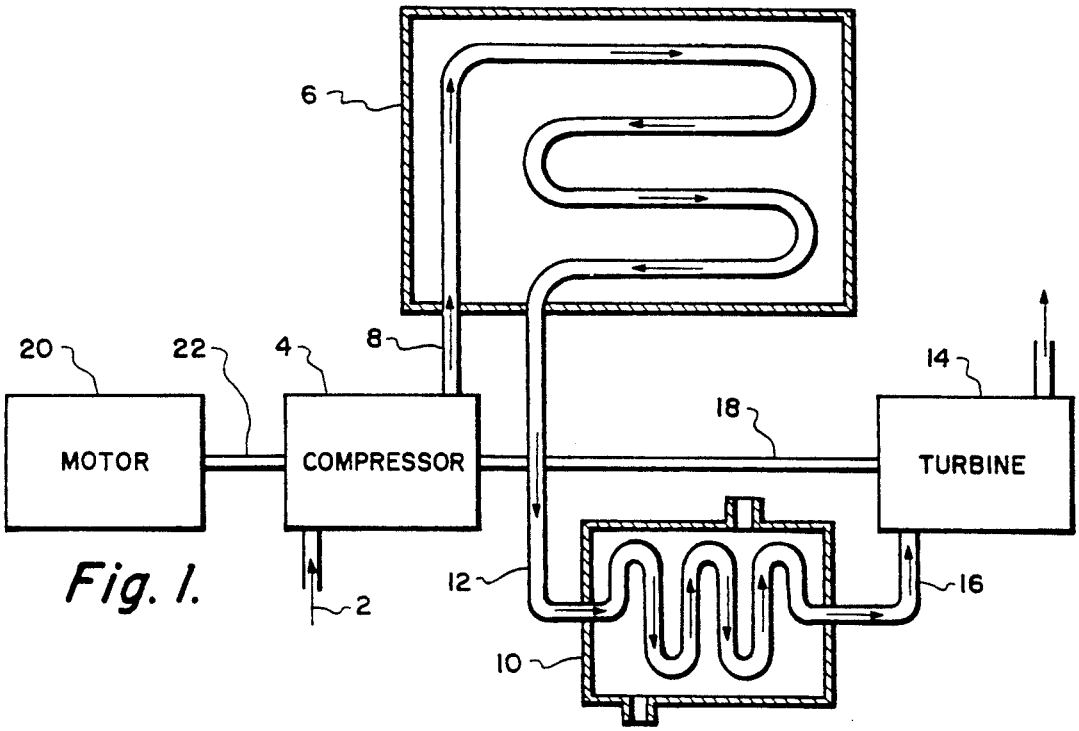
FIG. 1 is a schematic of the present invention showing the flowpath and relationship of the various elements.
Figure 2:
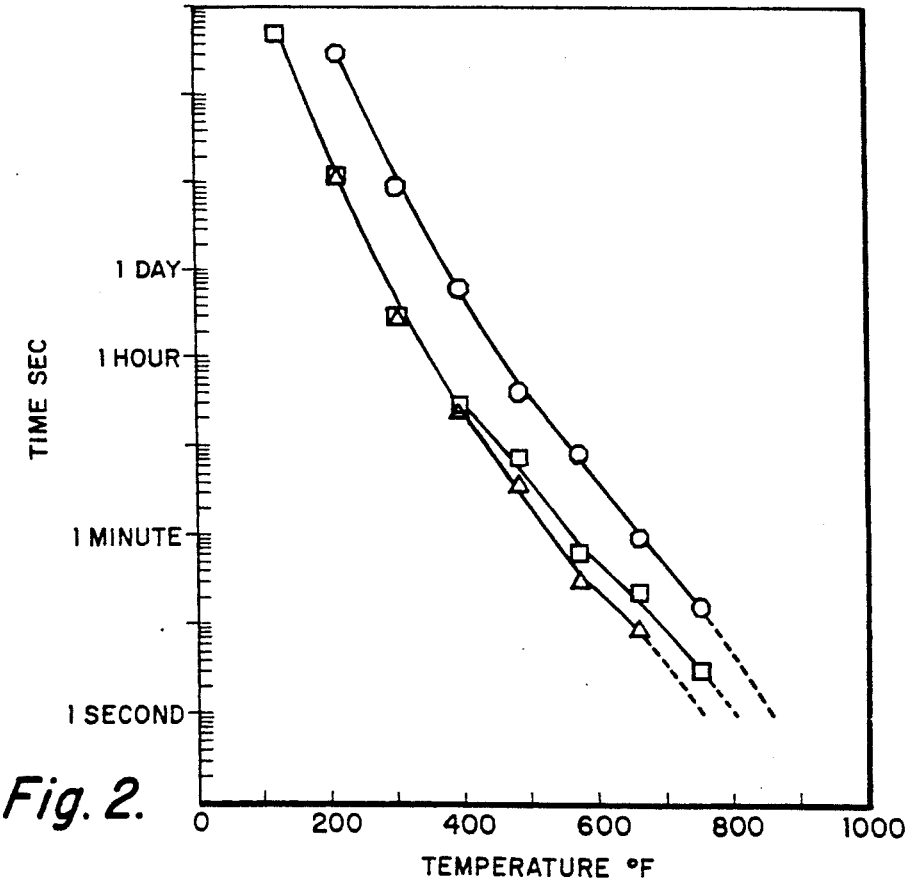
FIG. 2 is a graph showing the time for 99% decomposition of 3 CBW agents at various temperatures.

The preferred embodiment of the present invention is illustrated by way of example in FIG. 1, contaminated air 2 (under standard temperature and pressure) enters compressor 4 and is adiabatically compressed wherein the temperature of air 2 is caused to rise to approximately 850° F. It should be noted that this temperature (850° F.) was chosen for the preferred embodiment since the CBW agents shown in FIG. 2 are destroyed in approximately 1 second at this temperature range. However, higher or lower temperatures may be chosen when, for example, it is desired to destroy CBW agents other than those depicted in FIG. 2 or when a different contact time is desired. It should also be noted that since the air is adiabatically heated, complete and even heating is obtained, thereby ensuring that no CBW agents escape through the system in "cold spots" as may be found in, for example, conventional combustion or electrically heated systems. In the preferred embodiment, compressor 2 is a thermally insulated compressor capable of compressing air to approximately 350 psi with little loss of heat to the environment. In small flow capacity systems, for example, less than 750 cfm, compressor 2 may be positive displacement design such as a piston cylinder, metal diaphragm or rotary screw type. In larger flow capacity systems, for example, greater than 750 cfm, compressor 2 may be a multistage centrifugal type. Suitable and preferred compressors are manufactured and/or commercially available from Pressure Products Industries, Warminster, Pa.; Burton Corblin N.A. Inc., Horsham, Pa.; or Cooper Industries, Quincy, Ill. Other compressors may be employed by those skilled in the art.

Hot, compressed air 2 is then ducted to reactor vessel 6 via pipeline 8. The purpose of reactor vessel 6 is to provide sufficient high temperature contact time for the chemical reactions to occur. (In some embodiments, compressor 4 alone or compressor 4 in combination with pipeline 8 may provide sufficient contact time at the desired temperature without the need for reactor vessel 6. However, in most embodiments reactor vessel 6 will be required.) As shown in FIG. 2, at a temperature of 850° F. a contact time of less than approximately one second is required. It should be noted that FIG. 2 depicts □ as GB (Sarin) nerve agent; Δ HD (mustard) blister agent; ∘ as VX nerve agent. In addition, part of each curve is shown in dashed lines (----) indicating that the dashed line portion is interpolated. Reactor vessel 6 is a conduit, insulated to minimize heat loss to the environment and may be fabricated from 18-8 stainless steel and wrapped with high temperature thermal insulation material such as calcium silicate. In the preferred embodiment reactor vessel 6 is approximately 25 feet in length with an internal X-sectional area of approximately 7 sq. in and is arranged and configured in a geometrically compact shape as, for example, shown in FIG. 1. For a flow rate of 1000 cfm a residence time of approximately one second is obtained. It should be noted that a ventilation air flow rate of 1000 cfm was chosen for the preferred embodiment and provides sufficient breathing air for 200 people at the American Society of Heating Refrigerating and Air-Conditioning Engineers (ASHRAC) recommended ventilation rate of 5 cfm. If desired, supplemental heat (not shown) may be added to air 2 in reactor vessel 6 by means of electric arc or electric resistance heaters. Air 2 is then ducted to aftercooler 10 via pipeline 12. The basic purpose of aftercooler 10 is to reduce the exit temperature of air 2 leaving aftercooler 10. However, the cooling of air 2 in aftercooler 10 has an ultimate effect on the exit temperature of air 2 leaving turbine 14. Thus, by regulating the temperature of breathable air 2 entering turbine 14 the exit temperature and, hence, the final (i.e. air leaving turbine 14) temperature of air 2 may be regulated. In this way, the final temperature may be regulated between, for example, 50° F. and 110° F. depending on whether an "air conditioned" (i.e. cool) building is desired or whether a heated building is desired. (Aftercooler 10 may be excluded from the system when, for example, the temperature of air 2 leaving turbine 14 is unimportant or when turbine 14 and the remainder of the system interact in such a way that the temperature of air 2 leaving turbine 14 is suitable and/or the additional control provided by aftercooler 10 is not needed.) Aftercooler 10 is an air-to-air heat exchanger and, in the preferred embodiment, removes 425,000 BTU/hr with an ambient cooling air temperature of 100° F., an air 2 inlet temperature of 850° F., a minimum air 2 discharge temperature of 600° F. and an air stream 2 flow rate of 1.25 lb/sec. A suitable and preferred aftercooler 10 is manufactured and commercially available from Armstrong Engineering Associates, West Chester, Pa; Brown Fintulse Company, Houston, Tex.; Excoa Division-Fintube Corp., Pryor, Okla. or Baltimore Aircoil Company, Baltimore, Md. Other aftercoolers may be employed by those skilled in the art. Other cooling means, such as, an air-to-water heat exchanger may be employed by those skilled in the art.

Air 2 is then ducted from aftercooler 10 to turbine 14 via pipeline 16. As hot, compressed air 2 flows through turbine 14 air 2 expands and does work on turbine 14. In this way, hot, compressed air 2 is brought to a suitable temperature and pressure for use in a building, tank or other space as a breathable air source. It should be noted that air 2 may be discharged from turbine 14 at a pressure above atmospheric say, for example, 15 psig. When discharged into a building, tank or other closed space, the discharged air 2 will tend to flow out of the building or tank thereby preventing any inflow of CBW agents.

A suitable and preferred turbine 14 may be designed and manufactured by Ingersoll-Rand, Woodcliff Lake, N.J., Elliot Company, Jeannette, Pa., Solar Turbines Inc., San Diego, Calif. or Coppus Engineering Corp., Worcester, Mass. These and other companies may also modify and/or adapt existing hardware to meet design requirements.

Energy imparted to turbine 14 by hot, compressed air 2 may be recovered and transferred to compressor 4 to increase the efficiency of the system. As shown in FIG. 1, turbine 14 is coupled to compressor 4 by drive shaft 18. (Turbine 14 may be excluded from the system when, for example, it is not desired to recover energy from hot, compressed air 2 and/or when aftercooler 10 alone provides sufficient cooling of air 2. It may also be desirable to utilize turbine 14 to extract energy (cooling) from air 2 without returning the extracted energy back to the system by way of, for example, drive shaft 18.)

External power to compressor 4 is supplied by motor 20 through driveshaft 22. In the preferred embodiment, motor 20 is a 150 hp diesel engine based on a compressor 4 efficiency of 80% and an overall turbine 14 efficiency of 90%. A gas turbine or other type of engine may be employed.

Obviously many modifications and variations of the present invention are possible in light of the above teachings. It is therefore to be understood that within the scope of the appended claims, the invention may be practiced otherwise than as specifically described.

What is claimed is:

1. A method for destroying chemical and biological warfare agents comprising the steps of:

(a) heating contaminated air in a compressor;

(b) cooling the hot, compressed air in an aftercooler;

(c) supplying power to the compressor by external power means.

2. The method defined in claim 1, further comprising the step of first flowing the compressed air from step (a) through a reaction vessel to provide sufficient contact time to destroy chemical and biological warfare agents.

3. A method for destroying chemical and biological warfare agents comprising the steps of:

(a) heating contaminated air in a compressor;

(b) cooling the hot compressed air in a turbine;

(c) supplying power to the compressor by external power means.

4. The method defined in claim 3, further comprising the step of first flowing the compressed air from step (a) through a reaction vessel to provide sufficient contact time to destroy the chemical and biological warfare agents.

5. The method defined in claim 3, further comprising the step of coupling the turbine to said compressor wherein the energy transferred to said turbine by said hot, compressed air is delivered to said compressor.

6. The method defined in claim 4, further comprising the step of coupling the turbine to said compressor wherein the energy transferred to said turbine by said hot, compressed air is delivered to said compressor.

7. A method for destroying chemical and biological warfare agents comprising the steps of:

(a) heating contaminated air in a compressor;

(b) cooling the hot, compressed air in an aftercooler;

(c) cooling the hot, compressed air in a turbine;

(d) supplying power to the compressor by external power means.

8. The method defined in claim 7, further comprising the step of first flowing the compressed air from step (a) through a reaction vessel to provide sufficient contact time to destroy chemical and biological warfare agents.

9. The method defined in claim 7, wherein the turbine is coupled to the compressor for transferring energy from said turbine to said compressor.

10. The method defined in claim 8, wherein the turbine is coupled to the compressor for transferring energy from said turbine to said compressor.

* * * * *